United States Patent [19]

Grundmann et al.

[11] 4,249,375
[45] Feb. 10, 1981

[54] HEAT EXCHANGER

[75] Inventors: Edgard Grundmann, Wolfsburg; Udo Herbst, Brunswick; Horst Pommerenke, Gifhorn, all of Fed. Rep. of Germany

[73] Assignee: Volkswagenwerk Aktiengesellschaft, Wolfsburg, Fed. Rep. of Germany

[21] Appl. No.: 897,646

[22] Filed: Apr. 18, 1978

[30] Foreign Application Priority Data

Apr. 19, 1977 [DE] Fed. Rep. of Germany ....... 2717159

[51] Int. Cl.³ .......................... F01N 3/02; F01N 7/16; F28F 9/02
[52] U.S. Cl. ........................................ 60/309; 60/321; 165/158; 181/244
[58] Field of Search .......................... 60/321, 309, 320; 165/158, 51, 52; 181/244, 253; 55/276, DIG. 30

[56] References Cited

U.S. PATENT DOCUMENTS

| 267,797 | 11/1882 | Miles | 165/158 |
|---|---|---|---|
| 1,090,144 | 3/1914 | Guimont | 165/158 |
| 1,610,810 | 12/1926 | Noll | 165/139 |
| 1,725,322 | 8/1929 | Vezie | 165/158 |
| 2,084,435 | 6/1937 | Deremer | 60/309 |
| 2,921,432 | 1/1960 | Marcotte | 60/309 |
| 3,302,394 | 2/1967 | Pahnke | 60/302 |
| 3,477,227 | 11/1969 | Bettega | 60/309 |
| 3,754,399 | 8/1973 | Ono | 60/309 |
| 3,831,377 | 8/1974 | Morin | 60/309 |

FOREIGN PATENT DOCUMENTS 845,699  8/1960  United Kingdom ..................... 165/158

*Primary Examiner*—Douglas Hart
*Attorney, Agent, or Firm*—Spencer & Kaye

[57] ABSTRACT

A heat exchanger for use with two media, one of which is to be heated up and the other of which is to be cooled down. The heat exchanger has an inlet and an outlet for the medium which is to be cooled down, as well as a plurality of parallel conduits which are connected between the inlet and outlet so that the medium flows through the conduits as it passes through the heat exchanger. The conduits are connected to each other such that the medium changes its direction of flow by 180° at least once between the point where it enters the heat exchanger through the inlet and the point where it leaves the heat exchanger through the outlet.

4 Claims, 3 Drawing Figures

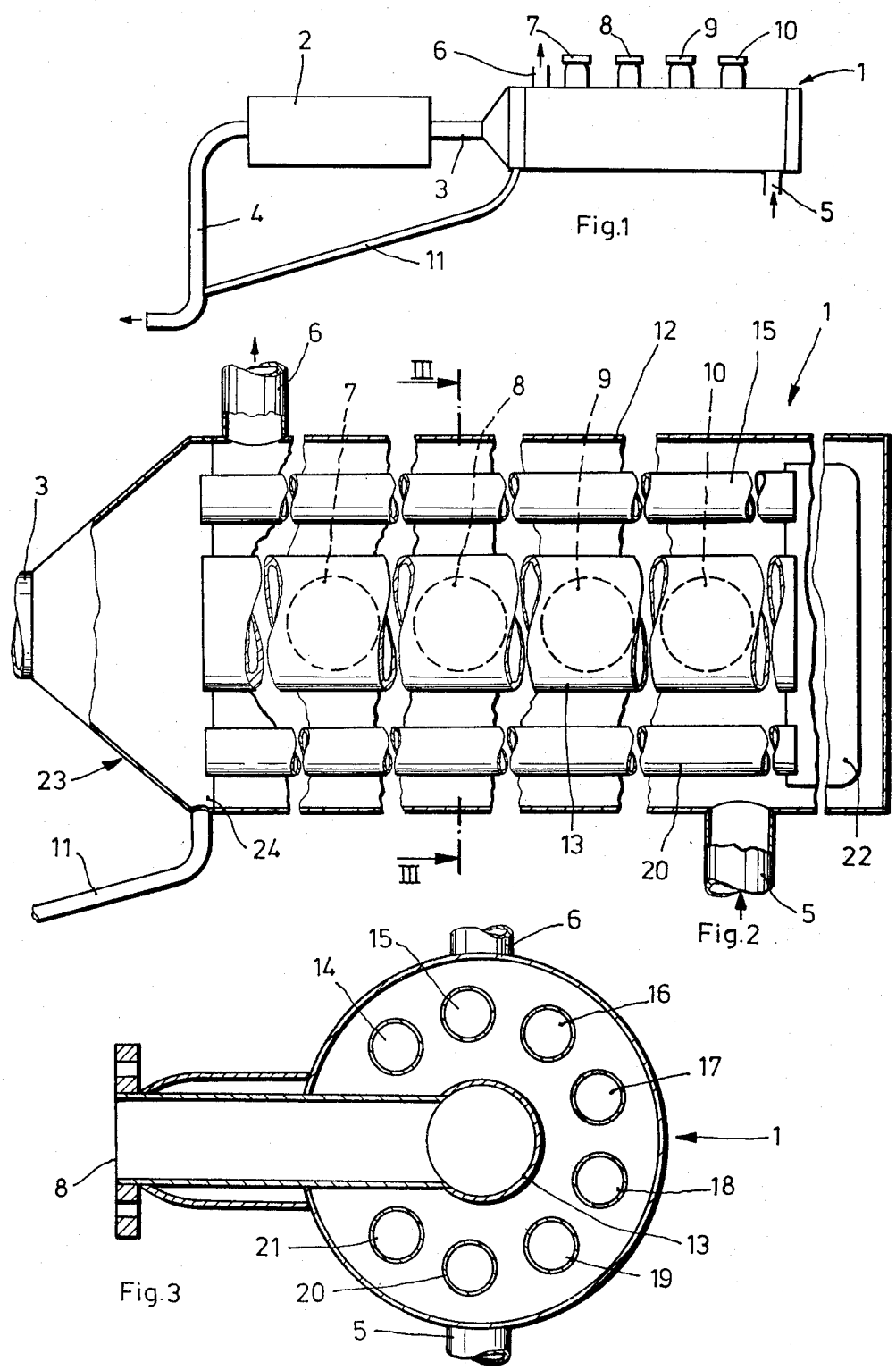

HEAT EXCHANGER

BACKGROUND OF THE INVENTION

The present invention relates to heat exchangers.

More particularly, the present invention relates to a heat exchanger which is suitable for use in the heating system of a motor vehicle and which has a housing through which flows a first medium which is to be heated up, the housing having a plurality of parallel conduits for a second medium which is to be cooled down, this second medium being constituted, for example, by the exhaust gases of an internal combustion engine, normally the engine of the vehicle in which the heating system is installed.

One example of such a heat exchanger is shown in German Pat. No. 532,606, in which there are a plurality of parallel conduits or tubes which are arranged within a cylindrical housing. The exhaust gas of the internal combustion engine is made to flow through all of these conduits in the same direction, and the remainder of the housing is traversed by the fluid medium which is to be heated up.

A heat exchanger of the above type has the advantage that the conduits for the medium to be cooled down are properly positioned so as to be subjected to the first medium, i.e., the medium which is to be heated up and which itself is therefore at low temperature. Splitting up the flow path for the second medium, i.e., the medium which is to be cooled down—this, in the case of an installation where this medium is used in the heating system of a motor vehicle, will be the exhaust gas coming from the engine—by providing a plurality of conduits, results in a large surface being exposed to the first medium, while providing an overall compact construction requiring little space. The more conduits for the second medium, the greater the efficiency of the heat exchanger. But even if the heat exchanger is provided with a large number of conduits for the second medium, the second medium will still be relatively hot when it exits the heat exchanger. If, then it becomes impractical to add still further conduits, the only way to increase the efficiency of the heat exchanger to the point where the temperature of the second medium exiting the heat exchanger will remain within practical limits, would be to lengthen the heat exchanger. However, there are limits beyond which the heat exchanger cannot be lengthened, lest it become so long that it would no longer be practical to use it as part of the heating system of a motor vehicle. In other words, the overall length of the heat exchanger can, in practice, not exceed a certain maximum, and it has been found that so long as the number of conduits for the second medium as well as the length of the heat exchanger must be kept within certain limits, the exhaust gases leaving the heat exchanger will still be excessively hot.

It is, therefore, the primary object of the present invention to provide a heat exchanger of the type which overcomes the mentioned drawbacks, namely, to provide a heat exchanger which, without significantly increasing the overall dimensions as compared to conventional heat exchangers, affords a greater heat transfer between the two media, and thus operates at higher efficiency than heretofore known heat exchangers of this type.

It is another object of the present invention to provide an improved heat exchanger of the above type in which condensate formed in the heat exchanger is removed so as to avoid the condensate from building up within the heat exchanger and so as to prevent the condensate from damaging any equipment connected to the outlet of the exchanger.

BRIEF DESCRIPTION OF THE INVENTION

With the above objects in view, the present invention resides in a heat exchanger for use with two media, one of which is to be heated up and the other of which is to be cooled down. The heat exchanger has inlet and outlet means for the medium which is to be cooled down, as well as a plurality of parallel conduits which are connected between the inlet and outlet so that the medium flows through the conduits as it passes through the heat exchanger. The conduits are connected to each other such that the medium changes its direction of flow by 180° at least once between the point where it enters the heat exchanger through the inlet and the point where it leaves the heat exchanger through the outlet.

In accordance with another feature of the present invention, when the medium which is to be cooled down is a gaseous medium such as the exhaust gas of an internal combustion engine, the heat exchanger is provided with a condensate drain conduit one end of which communicates with a point of the outlet which lies below the level of the conduits. If the outlet of the heat exchanger is connected to an exhaust pipe system which includes a sound-damping muffler, the other end of the drain conduit is connected to the exhaust pipe system at a point thereof which is downstream of the muffler, in consequence of which condensate drained from the heat exchanger by-passes the muffler.

BRIEF DESCRIPTION OF THE DRAWINGS

FIG. 1 is schematic diagram showing a heat exchanger which has flowing into it in the exhaust gases of an internal combustion engine of a motor vehicle, the heat exchanger being connected to a muffler through which the exhaust gases pass after exiting the heat exchanger.

FIG. 2 is a longitudinal sectional view of a heat exchanger according to the present invention.

FIG. 3 is a sectional view taken along line III—III of FIG. 2.

DETAILED DESCRIPTION OF THE PREFERRED EMBODIMENTS

Referring now to the drawings and first to FIG. 1 thereof, the same shows a heat exchanger indicated generally at 1. The heat exchanger has a generally cylindrical housing which is connected to the input end — here the right-hand end — of a sound-damping muffler 2 by way of an exhaust conduit 3. The output end of the muffler is connected to an exhaust pipe 4. The heat exchanger has an inlet stud 5 and an outlet stud 6 for a liquid medium, such as water, which flows through the heating system of the vehicle, these studs being diagonally opposed and located at opposite ends of the heat exchanger housing so that the luquid medium will flow through the interior of the housing. The liquid medium is the colder of the two media which flow through the heat exchanger. The second medium is the exhaust gas coming from the internal combustion engine (not shown), there being inlet means in the form of four inlet conduits 7, 8, 9, 10, which communicate with the individual cylinders of the internal combustion engine. The exhaust gas flows through the inlet studs and, as will be explained below in connection with FIGS. 2 and 3, through conduits located within the heat exchanger housing, and from there to the exhaust conduit 3 and the muffler 2. FIG. 1 likewise shows a further conduit 11 which has a relatively small cross section, as, for example, a diameter of 4 mm, this conduit 11 serving as a drain for condensate formed within the heat exchanger housing. This drain conduit 11 runs from the housing to a point in the exhaust pipe 4 which is downstream of the muffler 2.

Referring now to FIGS. 2 and 3, the same show the heat exchanger 1 by itself. Arranged within the cylindrical housing 12 is a central conduit 13 with which the inlet conduits 7, 8, 9. 10, are in communication. As is apparent from the drawings, the inlet conduits 7, 8, 9, 10, merge radially into the central conduit 13, the latter being surrounded by a plurality of parallel outer conduits 14, 15, 16, 17, 18, 19, 20, 21. These outer conduits are arranged along the arc of a circle surrounding the central conduit 13. All of the conduits 14 to 21 as well as the central conduit 13 are, at their right-hand ends as viewed in FIG. 2, in communication with a header chamber 22. The left-hand end of the central conduit 13 is closed whereas the left-hand end of each of the outer conduits 14 to 21 is open and communicates with a chamber defined by a generally funnel-shaped wall 23. The wide mouth of the chamber connects with the left-hand end of the cylindrical housing 12 whereas the narrow end of the funnel-shaped chamber communicates with the exhaust conduit 3, so that the chamber serves as an outlet means in the form of a common collector for the exhaust gases emanating from the open ends of the outer conduits 14 to 21.

The conduits 13 to 21 are made of a material which is a good conductor of heat, so that heat will readily be transferred from the hot exhaust gases flowing through these conduits to the colder medium which enters the housing 12 through the inlet stud 5 and leaves it through the outlet stud 6.

It will be appreciated that the exhaust gases entering the heat exchanger by way of the inlet conduits 7, 8, 9, 10, will enter the central conduit 13, in which they will flow from left to right until they reach the header chamber 22 where they are deflected by 180°. The gases will thereafter flow through the outer conduits 14 to 21 from right to left, whereafter they will exit the heat exchanger through the collector chamber 23. By virtue of this arrangement, the dwell time of the hot gases in the heat exchanger will be relatively high, because the entire volume of the gas coming from the internal combustion engine will be made to travel along a path that is longer than if there were no 180° reversal. This relatively high dwell time will encourage an efficient heat exchange between the exhaust gases flowing through the heat exchanger and the liquid medium which fills that portion of the interior of the heat exchanger which is not occupied by the parts through which the hot exhaust gases flow. Moreover, the arrangement of the conduits provides a good heat shield which prevents the loss of heat to the outside.

While FIGS. 2 and 3 show eight conduits which surround the central circuit, it is within the scope of the present invention to provide a different number of such conduits. For example, more than eight conduits can be provided, particularly if the several conduits are arranged along two or more concentric circular arcs surrounding the central conduit, in which case the conduits arranged along consecutive arcs can be circumferentially staggered. Such an arrangement allows a maximum number of conduits to be placed around the central conduit while keeping the overall dimensions of the heat exchanger small. That is to say, if the individual conduits surrounding the central conduit are staggered both radially and circumferentially, the interstices between the conduits can be kept small, so as to allow for the greatest possible surface exposure which, in turn, will increase the heat exchange efficiency.

Another feature which increases the efficiency of the heat exchanger is that the water jacket encompasses the inlet conduits 7, 8, 9, 10. This not only prevents the heat of the exhaust gases from being lost to the ambient atmosphere, but it enables the inlet conduits themselves to participate in the heat exchange with the liquid medium in the housing 12.

As is apparent from the drawing, the funnel-shaped wall 23 which forms the collector chamber for the exhaust gases emanating from the conduits 14 to 21 serves as the left-hand end wall for the cylindrical housing 12. The lowest region of the chamber 23 is below the level of the conduits 13 to 21 and is indicated at 24, and it is with this region that the above-mentioned condensate drain conduit 11 communicates.

It will be appreciated that in a heat exchanger in which a gaseous medium is cooled down, particularly when the heat exchanger operates at high efficiency, a certain amount of condensate will be formed. The condensate may, for one thing, adversely affect the operation of the heat exchanger; moreover, the condensate can have a corrosive effect on the heat exchanger itself as well as on equipment connected to the output of the heat exchanger, such as a muffler if, as in the described embodiment, one of the media flowing through the heat exchanger is the exhaust of an internal combustion engine of a motor vehicle. Therefore, the heat exchanger according to the present invention is provided with the condensate drain conduit 11 which, as stated above, runs from the lowest point 24 of the chamber 23 to a point in the exhaust pipe 4 which is downstream of the muffler 2. In this way, not only is the condensate readily drained from the heat exchanger housing 12, but in addition, the drain conduit 11 serves as a by-pass which prevents condensate from reaching the muffler 2.

It will be understood that the above description of the present invention is susceptible to various modifications, changes and adaptations, and the same are intended to be comprehended within the meaning and range of equivalents of the appended claims.

What is claimed is:
1. A heat exchanger comprising in combination
 (a) an elongated housing including means defining an inlet for passing through said housing a first medium which is to be heated;
 (b) passage means accommodated within said housing for being surrounded by said first medium passing through said housing; said passage means including
  (1) a central conduit extending substantially medially of said housing in the length dimension thereof; said central conduit having a closed end and an open end;
  (2) a plurality of outer conduits extending substantially parallel to and spaced from said central conduit; said outer conduits surrounding said central conduit as a group; each said outer conduit having first and second open ends; said first open ends being arranged in the zone of said open end of said central conduit and said second open ends being arranged in the zone of said closed end of said central conduit;

(3) a vessel defining a header chamber into which merge said open end of said central conduit and said first open ends of said outer conduits;

(c) at least one inlet conduit projecting into said housing from the outside thereof and merging into said central conduit in a radial orientation with respect thereto at a location spaced from said closed end thereof for being surrounded by said first medium passing through said housing and for introducing into said passage means a second medium which is to be cooled; and (d) an outlet conduit into which merge said second open ends of all of said outer conduits for withdrawing said second medium from said passage means.

2. A heat exchanger as defined in claim 1, wherein said outlet, conduit forms a single chamber which communicates with said second open ends of said outer conduits.

3. A heat exchanger as defined in claim 1, wherein the second medium is a gaseous medium and wherein said outlet conduit has a point which lies below the level of said outer conduits, the heat exchanger further comprising a condensate drain conduit communicating at one end thereof with said point of said outlet conduit.

4. In combination with a heat exchanger as defined in claim 3, an exhaust pipe system connected to said outlet, conduit of said exchanger and including a sound-damping muffler, said drain conduit communicating at its other end with said exhaust pipe system at a point thereof which is downstream of said muffler, in consequence of which condensate drained from the heat exchanger by-passes the muffler.

* * * * *